Sept. 1, 1964 R. A. WILSON 3,146,860
TORSIONAL VIBRATION DAMPER FOR DISC BRAKE OR CLUTCH
Filed April 9, 1962 3 Sheets-Sheet 1

INVENTOR.
RICHARD A. WILSON
BY
ATTORNEY

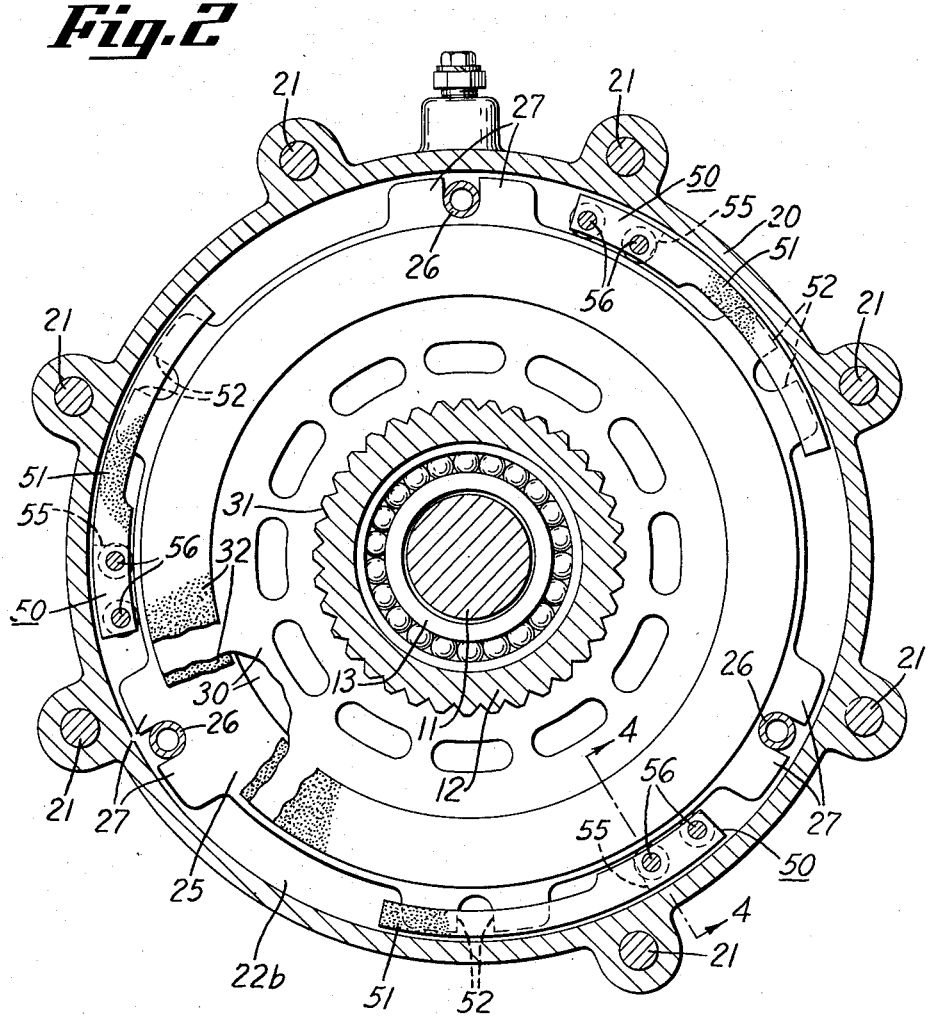

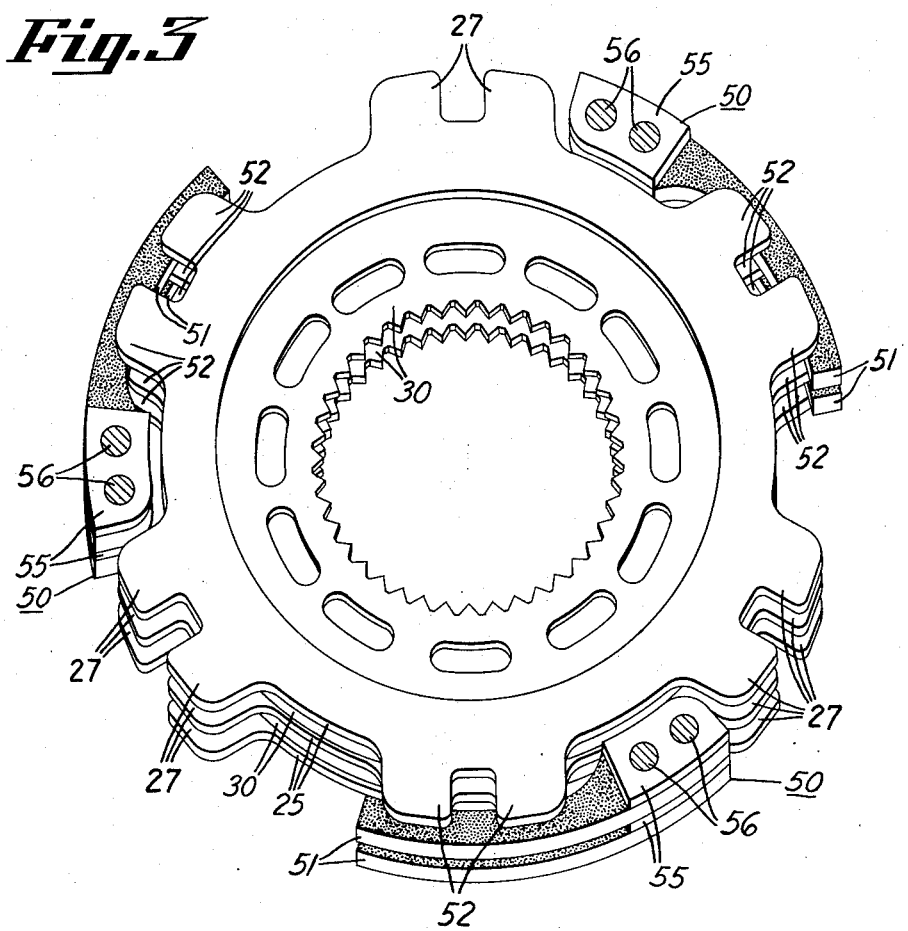

United States Patent Office 3,146,860
Patented Sept. 1, 1964

3,146,860
TORSIONAL VIBRATION DAMPER FOR DISC BRAKE OR CLUTCH
Richard A. Wilson, Milford, Mich., assignor to General Motors Corporation, Detroit, Mich., a corporation of Delaware
Filed Apr. 9, 1962, Ser. No. 185,964
5 Claims. (Cl. 188—72)

This invention relates to disc brakes or clutches and particularly to a disc brake.

In multiple disc brakes, or clutches, there is usually provided a plurality of rotatable discs that rotate between adjacent pairs of nonrotatable discs or annular members, suitable means being provided to effect a compression of the disc stack into frictional engagement between the rotatable and the nonrotatable discs to result in a retarding movement of the rotatable discs, or a brake action when the structure is used as a brake for a vehicle. Axial movement of the rotatable and nonrotatable discs is required to provide for complete disengagement of the rotatable discs from the nonrotatable discs when the brake or clutch is in release condition and provide for their interengagement when in active braking or clutching condition. Usually the nonrotatable discs are suitably supported within a housing structure on guide members or pins to provide for such axial movement and the rotatable discs are splined upon a rotatable member or support element that is attached to the wheel of a vehicle when the structure is used as a brake.

In a multiple disc brake or clutch structure there is the difficulty of torsional vibration of the rotatable and/or the nonrotatable discs when the disc stack is engaged for a brake application or during a clutch operation, which torsional vibration results in an objectionable high-pitched squeal. With the nonrotatable discs carried on a suitable pin structure that allows for axial movement of the discs relative to one another and relative to the rotatable discs and with the rotatable discs splined to the rotatable member that supports the wheel of a vehicle torsional vibration can be created between the discs.

It is therefore an object of this invention to incorporate a frictional damping device between the torsionally or peripherally oscillating nonrotatable discs and the housing of the brake or clutch structure to effectively damp the torsional oscillation and thereby avoid objectionable high-pitched squeal.

The foregoing object of the invention is accomplished by mounting damping fingers upon the housing of the structure which have their free ends between fingers on the nonrotatable discs, or adjacent thereto, so that the fingers on the nonrotatable discs frictionally engage the damping fingers that are provided with friction material, or are composed of a friction material, so that torsional oscillation of the nonrotatable and/or the rotatable discs will be damped by frictional engagement with the damping fingers that are securely mounted to the housing of the structure.

Further objects and advantages of the present invention will be apparent from the following description, reference being had to the accompanying drawings wherein preferred embodiments of the present invention are clearly shown.

In the drawings:

FIGURE 2 is a transverse cross-sectional view taken substantially along line 2—2 of FIGURE 1;

FIGURE 3 is a perspective elevational view of the assembly arrangement of the nonrotatable and rotatable discs together with the damping fingers placed between finger extensions on the nonrotatable discs.

Figures 1, 4:
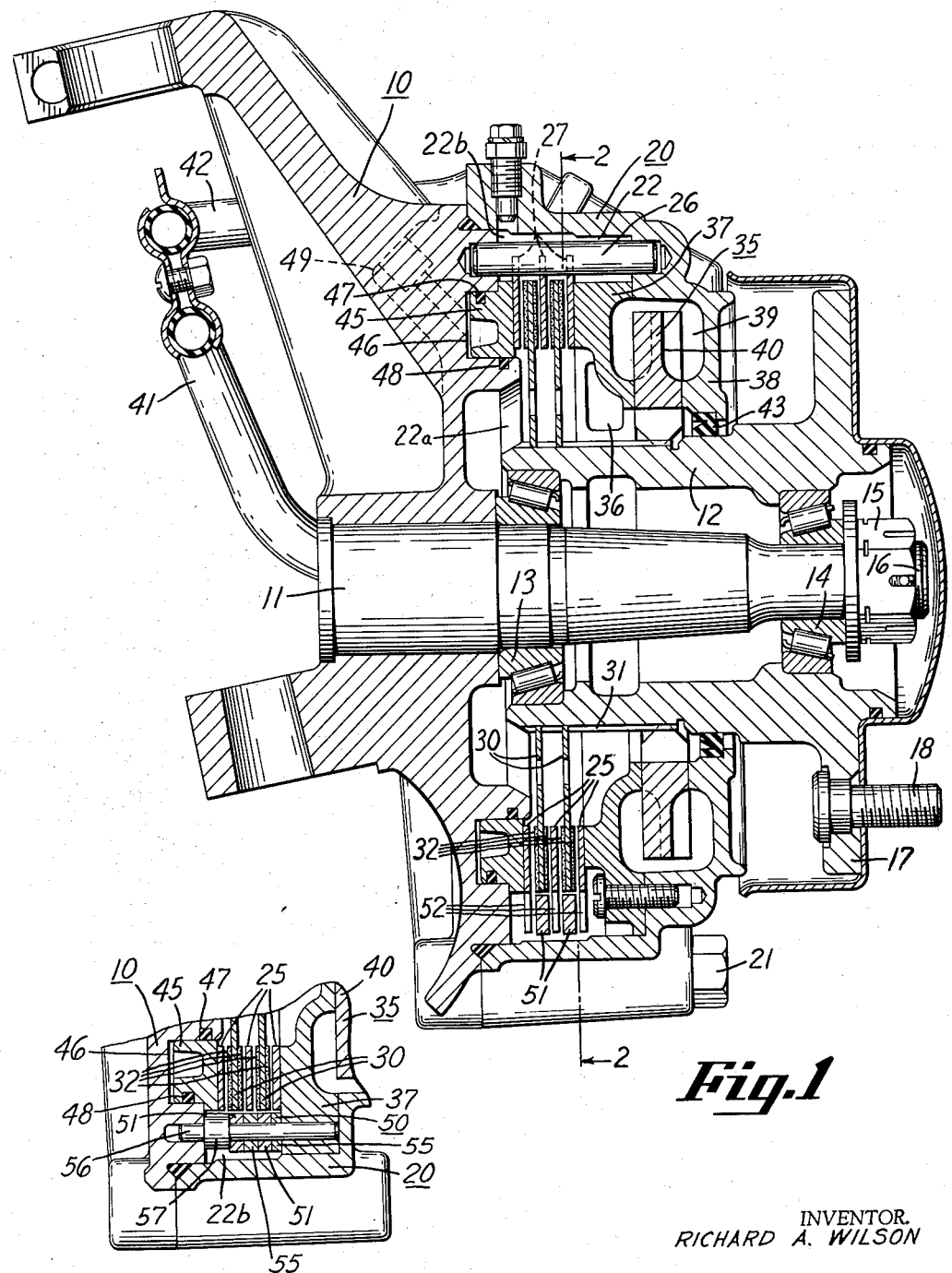
FIGURE 1 is a vertical cross-sectional view of a brake structure for the front wheel of a vehicle incorporating features of this invention.
FIGURE 4 is a partial cross-sectional view taken along line 4—4 of FIGURE 2.

In this invention the structure incorporating the feature of invention is illustrated as a brake for the front wheel of a vehicle. The primary structure consists of a plate-like casting 10 that supports a wheel spindle 11 which in turn carries a support member or wheel hub 12 supported on spindle 11 by the antifriction bearings 13 and 14. The antifriction bearings and the hub are secured on the spindle 11 by means of a nut 15 carried on the threaded end 16 of the spindle 11. The hub 12 has a radial flange 17 that carries a plurality of studs 18 which in turn support a wheel on the hub 12.

A housing structure 20 is secured to the plate-like casting 10 by means of a plurality of bolts 21, the housing 20 and the plate 10 cooperating to form a chamber 22 in which the brake structure is placed.

The brake structure consists of a plurality of nonrotatable discs 25 or annular rings that are supported on three pins 26 spaced equidistantly about the periphery of the discs 25. Each of the discs 25 has fingers 27 placed at opposite sides of each of the pins 26 to support the discs on the pins 26 and provide for axial movement of the discs 25 relative to the spindle 11 and relative to each other. The pins 26 also in cooperation with the fingers 27 prevent the discs 25 from rotating in the housing 20.

A plurality of rotatable discs are positioned within the housing 20 and between adjacent pairs of nonrotatable plates or discs 25. These rotatable discs 30 are supported upon a spline portion 31 on the hub 12 so that they will rotate with the hub 12 and will also have axial movement relative to each other and relative to the nonrotatable plates or discs 25. Each of the rotatable discs 30 carry annular friction faces 32 at each of opposite sides of the disc 30, which faces are engageable with the nonrotatable discs or plates 25 when the disc stack is moved in an axial direction to so effect frictional engagement between the rotatable discs 30 and the nonrotatable discs 25.

The pins 26 are supported between the housing 20 and the plate 10 which forms the opposite wall of the housing, as shown in FIGURE 1.

Since the disc stack consisting of the plates 25 and 30 are totally enclosed, it is desirable to remove the heat of friction during the brake application of the structure by means of circulation of a cooling fluid. This is accomplished by means of a fluid circulating pump 35 that has an outlet 36 for flow of cooling fluid into the chamber 22 for circulation between the discs of the disc stack, each of the friction faces 32 having a suitable grooved pattern to provide for circulation of cooling fluid from the inner chamber area 22a to the outer chamber area 22b.

The fluid circuating pump 35 is formed of a secondary wall 37 that cooperates with the wall 38 of the housing 20 to form a pump chamber 39 in which an impeller 40 rotates. The impeller 40 is drivingly connected with the hub 12 by having its inner radial surface in connection with the spline portion 31 on the hub 12. Cooling fluid is supplied to the pump chamber 39 by a conduit 41 that connects with a suitable heat exchanger and fluid is discharged from the chamber 22b to the heat exchanger through the conduit 42. A suitable rubber seal 43 is provided between the housing wall 38 and the hub 12 to prevent loss of cooling fluid from the chamber 22a.

To effect compression of the disc stack consisting of the discs 25 and 30 into engagement to effect a braking application there is provided an annular piston 45 positioned within an annular cylinder 46 with suitable seals 47 and 48 provided between the piston 45 and the cylinder 46 to prevent loss of hydraulic fluid supplied into the annular cylinder 46 from a master cylinder (not shown) through a suitable inlet passage 49.

As previously mentioned, when the disc stack consisting of the discs 25 and 30 is compressed by axial movement of the piston 45 upon supply of hydraulic fluid into the annular cylinder 46 from the master cylinder (not shown), there is effected frictional engagement between the nonrotatable discs 25 and the rotatable discs 30 with the friction faces 32 of the rotatable discs 30 engaging the faces of the nonrotatable discs 25. Since the nonrotatable discs 25 and the rotatable discs 30 must have some relative axial movement to provide for their engagement and disengagement during a brake operation, it will be appreciated that a torsional oscillation can be created between the nonrotatable discs 25 and the pin 26 as well as between the rotatable discs 30 and the spline connection 31.

During a brake application the torque applied between the hub 12 and the discs 30 is such as to normally take up the manufacturing tolerance on one side of the spline connection, but they can oscillate. Also, while there is torque applied between the fingers 27 and the pins 26, depending upon the direction of rotation of the rotatable discs 30, nevertheless the fingers 27 of the nonrotatable discs 25 are free relative to their connecting pins 26, which freedom of movement has resulted in torsional oscillation between the nonrotatable discs 25 and the pins 26, that is between the discs 25 and the housing 20. The result is that torsional oscillation, whatever the cause, produces a high-pitched squeal that is objectionable.

It is to prevent this high-pitched squeal that the damping devices of this invention are used in cooperation with the nonrotatable discs 25 of the brake structure.

As clearly illustrated in FIGURES 2 and 3, there are three of the damping devices 50 positioned equidistantly about the periphery of the disc stack. Each of the damping devices is securely fastened to the housing 20 so that one end of each of the damping devices is a fixed point that has no movement relative to the housing 20.

Each of the damping devices 50 consists of one or more damping fingers 51 that are positioned between the radially extending fingers 52 on each of the nonrotatable discs or annular plates 25, as more particularly shown in FIGURES 2 and 3. Each of the fingers 51 is surfaced with a friction material or is composed of a friction material so that engagement of the fingers 52 on the nonrotatable discs or plates 25 will result in friction engagement with the fingers 51 and thereby tending to resist torsional oscillation of the fingers 52 relative to the fingers 51. This effectively damps the torsional oscillation of the discs or plates 25 relative to the housing 20 and reduces or substantially eliminates high-pitched squeal previously effected in brakes of this character.

Each of the damping fingers 51 has a thickness that is substantially equal to the thickness of the rotatable discs 30 including the friction surface material 32 that is placed on the discs 30 as annular rings at the periphery of the discs 30. At least the fingers 51 do not have a thickness that is less than the total thickness of the discs 30 taken with the friction face 32 so that the fingers 52 on the nonrotatable plates or discs 25 frictionally engage the surfaces of the friction fingers 51. This frictional engagement is maintained during engagement of the nonrotatable discs 25 with the rotatable discs 30. Spacer elements 55 are provided adjacent the fingers 51 so that the fingers 51 will be free of engagement with the fingers 52 on the nonrotatable discs when the disc stack is in released condition, as more particularly shown in FIGURES 1 and 4.

The fingers 51 together with the spacers 55 are secured between the secondary wall 37 in the housing 20 and the plate wall 10 on pins 56, and are held in position by means of a spacer 57 that compresses the fingers 51 and the spacers 55 together into a solid unit with the housing when the housing is in assembled condition, as shown in FIGURE 4.

Since it is obvious from FIGURE 4 that the total width of the disc stack consisting of the discs 25 and 30 is greater than the total width of the fingers 51 and their spacers 55 when the brake is in the retracted position, the fingers 51 will need to be of sufficient flexibility as to allow the axial movement of the discs 25 and 30. Once the disc stack is brought into face engagement with the nonrotatable plates engaging the rotatable discs, the axial force applied on the disc stacks will be the same axial force that is applied by the fingers 52 upon the fingers 51. Therefore, the frictional damping between the fingers 51 and 52 will be caused by the same force that provided the frictional excitation. Thus, the damping force will vary directly as the excitation force to maintain a balance between the frictional energy supplied to the frictional system and the damping energy that is removed from the system.

While the embodiments of the present invention as herein disclosed constitute preferred forms, it is to be understood that other forms might be adopted.

What is claimed is as follows:

1. In a brake or clutch structure, the combination of, a housing, a rotatable support means rotatably supported in said housing, rotatable disc means carried on said support means and rotatable therewith, nonrotatable disc means carried by said housing with respect to which said first mentioned disc means rotates, means operable on said disc means to effect relative axial movement thereof with resultant frictional engagement between the faces of said rotatable disc means and said nonrotatable disc means, radially extending finger means on said nonrotatable disc means, and additional friction finger means carried on said housing engageable in surface friction relation with said first mentioned finger means during the engagement between said rotatable disc means and said nonrotatable disc means resisting thereby torsional oscillation between said nonrotatable disc means and said housing.

2. In a brake or clutch structure, the combination of, a housing, a rotatable support means rotatably supported in said housing, rotatable disc means carried on said support means and rotatable therewith, nonrotatable disc means carried by said housing and axially movable relative thereto and with respect to which said first mentioned disc means rotates, means operable on said disc means to effect relative axial movement thereof with resultant frictional engagement between the faces of said rotatable disc means and said nonrotatable disc means, radially extending finger means on said nonrotatable disc means, and additional friction finger means secured to and carried on said housing and having friction surface means engageable in surface area relation with said first mentioned finger means during engagement between said rotatable disc means and said nonrotatable disc means resisting thereby torsional oscillation between said nonrotatable disc means and said housing, said additional friction finger means being flexible in an axial direction to provide for said axial movement of said nonrotatable disc means.

3. In a brake or clutch structure, the combination of, a housing, a rotatable support means rotatably supported in said housing, rotatable disc means carried on said support means and rotatable therewith, a plurality of nonrotatable disc means carried by said housing and axially movable relative to one another and with respect to which said first mentioned disc means rotates between said non-rotatable disc means, means operable on said disc means to effect relative axial movement thereof with resultant frictional engagement between the faces of said rotatable disc means and said nonrotatable disc means, radially extending finger means on each of said nonrotatable disc means axially aligned, and additional friction finger means positioned between said first mentioned finger means and carried on said housing and having friction surface areas frictionally engageable with said first mentioned finger means in friction area contact during engagement between said rotatable disc means and said nonrotatable disc means resisting thereby torsional oscillation between said nonrotatable disc means and said housing.

4. In a brake or clutch structure, the combination of, a housing, a rotatable support means rotatably supported in said housing, rotatable disc means carried on said support means and rotatable therewith, a plurality of nonrotatable disc means carried by said housing and axially movable relative to one another and with respect to which said first mentioned disc means rotates between said nonrotatable disc means, means operable on said disc means to effect relative axial movement thereof with resultant frictional engagement between the faces of said rotatable disc means and said nonrotatable disc means, radially extending finger means on each of said nonrotatable disc means axially aligned, and additional friction finger means positioned between said first mentioned finger means and carried on said housing and having a section secured to said housing and a friction surface area section joined thereto in axial flexing relation frictionally engageable in surface area relation with said first mentioned finger means during engagement between said rotatable disc means and said nonrotatable disc means resisting thereby torsional oscillation between said nonrotatable disc means and said housing, said flexibility in an axial direction to provide for said axial movement between said nonrotatable disc means while retaining positive frictional surface area engagement with the said finger means on the said nonrotatable disc means.

5. In a brake or clutch structure, the combination of, a housing, a rotatable support means rotatably supported in said housing, rotatable disc means carried on said support means and rotatable therewith, a plurality of nonrotatable disc means carried by said housing and axially movable relative to one another and with respect to which said first mentioned disc means rotates between said nonrotatable disc means, means operable on said disc means to effect relative axial movement thereof with resultant frictional engagement between the faces of said rotatable disc means and said nonrotatable disc means, radially extending finger means on each of said nonrotatable disc means axially aligned, and additional friction finger means extending in a peripheral direction around said rotatable disc means and radially adjacent thereto and positioned between said first mentioned finger means and fixedly secured at one end on said housing and engageable adjacent the other end thereof with said first mentioned finger means in friction surface area relation during engagement between said rotatable disc means and said nonrotatable disc means resisting thereby torsional oscillation between said nonrotatable disc means in said housing and flexible in an axial direction intermediate the ends thereof to provide for said axial movement of said nonrotatable disc means between said nonrotatable disc means and said rotatable disc means.

References Cited in the file of this patent

UNITED STATES PATENTS

| | | |
|---|---|---|
| 1,742,805 | Carhart | Jan. 7, 1930 |
| 1,933,176 | Jonsson | Oct. 31, 1933 |
| 2,381,393 | Brown | Aug. 7, 1945 |
| 2,738,864 | Becker | Mar. 20, 1956 |
| 2,764,261 | Bridges | Sept. 25, 1956 |
| 2,879,867 | Rike | Mar. 31, 1959 |
| 2,914,140 | Werner | Nov. 24, 1959 |

FOREIGN PATENTS

| | | |
|---|---|---|
| 614,913 | Great Britain | Dec. 30, 1948 |
| 1,180,700 | France | Jan. 5, 1959 |